Sept. 7, 1937.     A. E. BERGLOFF     2,092,239
CABLE HITCH HOLDER
Filed Feb. 24, 1936     2 Sheets-Sheet 1
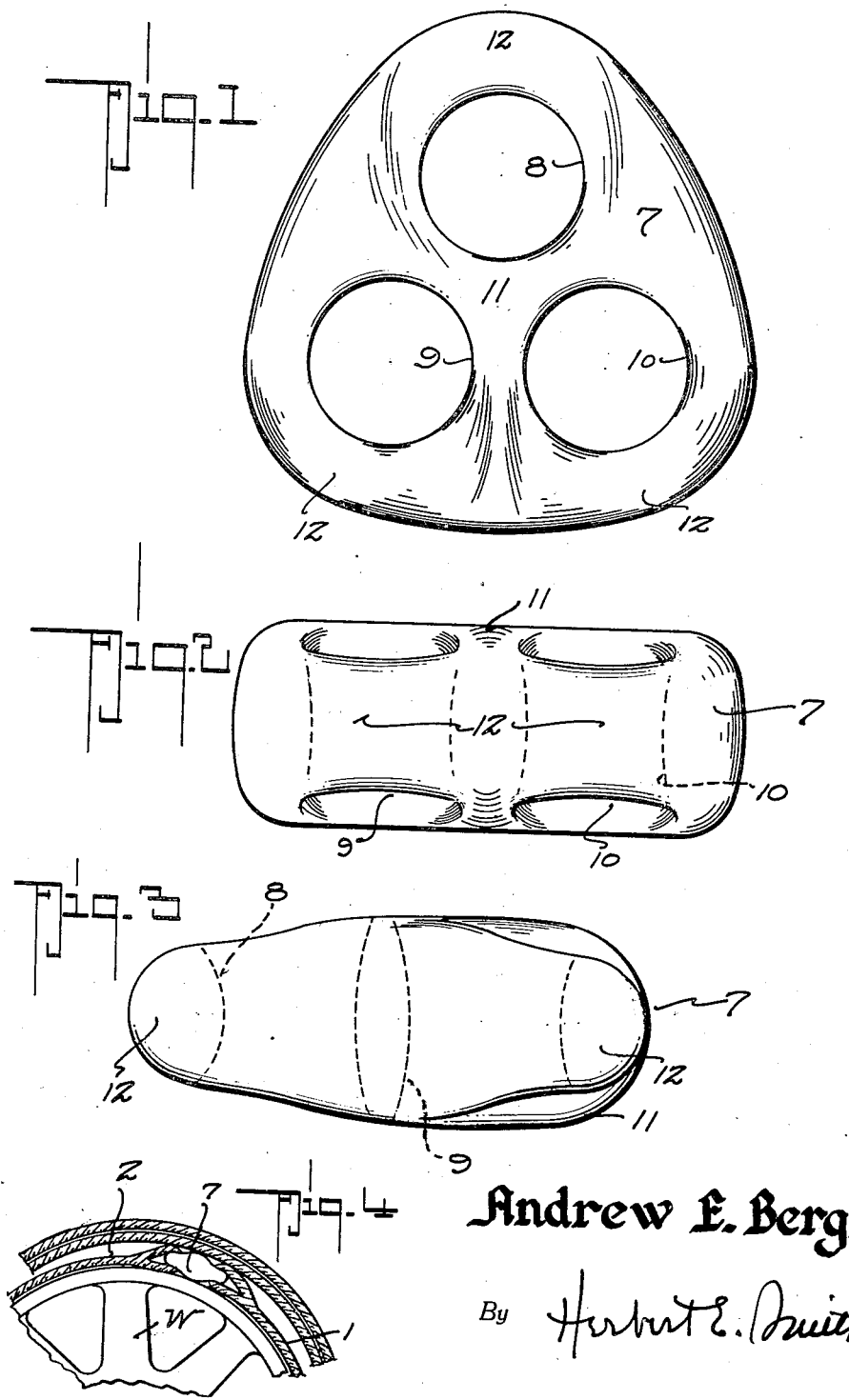
Andrew E. Bergloff
Inventor
By Herbert E. Smith
Attorney Sept. 7, 1937.  A. E. BERGLOFF  2,092,239
CABLE HITCH HOLDER
Filed Feb. 24, 1936  2 Sheets-Sheet 2

*Andrew E. Bergloff*
Inventor

By *Herbert E. Smith*
Attorney

Patented Sept. 7, 1937

2,092,239

UNITED STATES PATENT OFFICE 2,092,239

CABLE-HITCH HOLDER

Andrew E. Bergloff, Quartz Mountain, Oreg.

Application February 24, 1936, Serial No. 65,239

1 Claim. (Cl. 24—129)

My present invention relates to improvements in cable-hitch holders or one piece coupling shackles, forming a permanent, but flexible or loose connection between a main cable and a pair of branch or hitch cables. While the cable-hitch holders of my invention are adapted for various uses, they are especially designed for use with hoisting, hauling, and other cables, such as employed in logging operations where the logs are hauled out of the woods by means of a tractor and a coupled dolly or pony truck. In the usual logging practice, the main cable which is wound on and unwound from a rotary drum, and the hitch cables, are connected or joined by clamp devices, U-bolts, and other instrumentalities, which are unusually expensive, heavy, and cumbersome. These devices are required for heavy duty, and the rigging is subjected to rough wear which impairs the durability of the rigging, necessitates frequent repairs thereto, and they interfere with the smooth operation of the winding drum or reel.

The primary object of my invention is the provision of a one piece shackle or cable-coupling or holder which reduces the friction and wear on the cables, thus enhancing their durability and reducing expense of replacements; simplifies the operation of mounting the logs in the dolly or truck; equalizes and distributes the strains imposed on the rigging; and insures a smooth operation of the rotary drum in winding and unwinding the cables. The invention consists in certain novel features of construction, and combinations and arrangements of parts as will hereinafter be more fully set forth and claimed.

In the accompanying drawings I have illustrated one complete example of the physical embodiment of my invention wherein the parts are combined and arranged according to one mode I have thus far devised for the practical application of the principles of my invention.

Figure 1 is a plan view of the one-piece cable-hitch holder or shackle. Figure 2 is a rear edge view; and Figure 3 is a lateral edge view of the holder.

Figure 4 is a detail view showing a portion of the winding drum and the relation thereto of the wound cable and cable-hitch holder.

Figure 5:
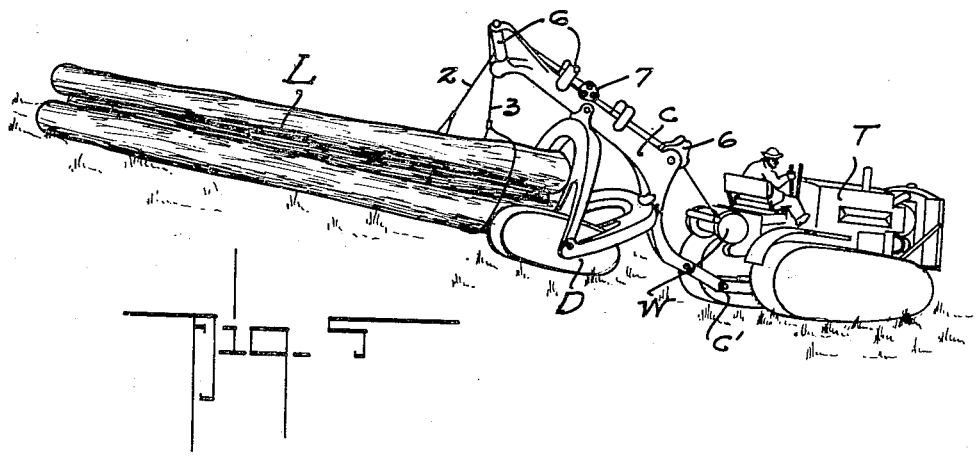
Figure 5 is a perspective view showing logs mounted on the dolly or truck through the use of my improved cable-hitch holder, and the tractor ready for transportation of the logs.
Figure 6:
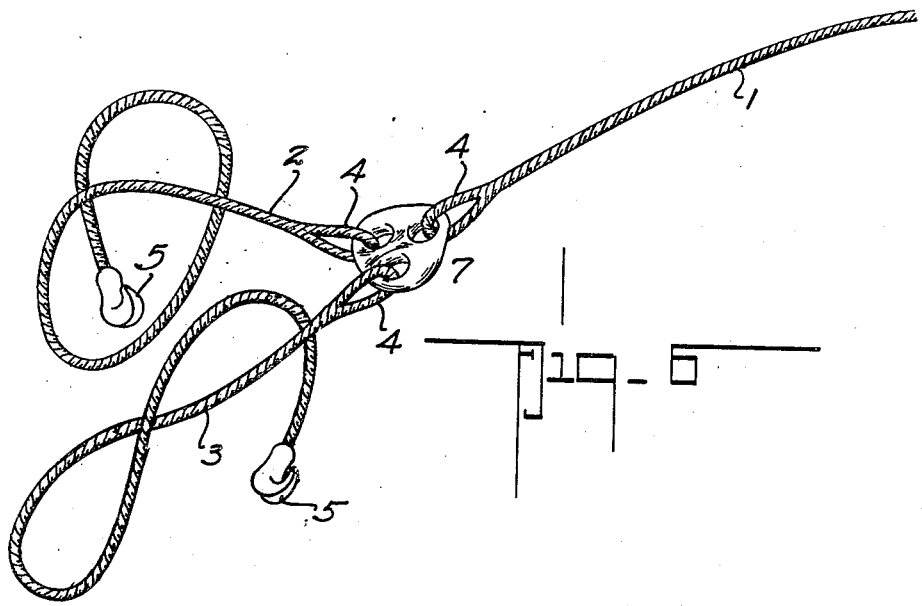
Figure 6 is an enlarged perspective view showing the cable-hitch holder joining the two hitch cables to the main cable.

In order that the utility, and advantages inherent in the cable-hitch holder may readily be apparent I have shown in Figure 5 the logs L with their butt ends or forward ends elevated slightly and supported from the dolly or pony truck D from its crane C, and the truck is coupled at C' to the tractor T. The main hauling and hoisting cable I is mounted on the winding drum W journaled in bearings at the rear of the tractor, and the butt ends of the logs are held suspended by the hitch cables 2 and 3.

The cables I, 2, and 3 are heavy-duty cables, ordinarily cumbersome to handle, and very expensive, and therefore they present a difficult problem in hitching the rigging about the logs, and also in reducing wear to a minimum for prolonging the life of the rigging and thus reducing the expense of maintenance. Each of the cables is fashioned with a spliced loop-end 4, and the hitch-cables are provided with hitch-hooks 5 at their free ends, which hooks are suitably engaged after the hook-ends of the hitch-cables are passed around under the logs. The main cable and the hitch-cables are wound on and unwound from the winding drum W, and the cables are guided in suitable guide rollers or sheaves 6.

The one piece hitch holder designated as a whole by the numeral 7 is fashioned of high grade steel and provided with a draft or front eye 8 passing transversely through the holder, and the main cable is first passed through this eye and then spliced to form its attaching loop 4, thus making the required comparatively loose connection between the main cable and the holder.

As indicated in Figure 1 the holder is of a general triangular flattened shape with two rear eyes 9 and 10 to which the attaching loops 4, 4, of the hitch-cables are spliced, and the walls of the eyes, especially the outer walls are rounded in cross section, to conform to the base portion of the loops 4 of the cables, insure a neat fit of the parts, and reduce wear on the cable-loops.

To render the holder strong and durable for resistance of strains imposed thereon, the central body portion of the holder is thickened, as at 11, and to insure a smooth winding of the cable, and the cable coupling on the winding drum, as shown in Figure 4, the edges of the holder are reduced in thickness as at 12. These reduced edges in connection with the eyes of the holder compensate for the enlargements occasioned by the presence of the loops 4, and the jointed parts or coupling of the cable naturally lie snugly in the wound cable on the drum, and insure a smooth winding and unwinding of the cables on and off the drum.

By this combination and arrangement of parts in the holder, and in the connections between the cables and the holder, substantially all obstructions, or protruding parts, are eliminated from the rigging, thus insuring smooth and facile movements of the cables in winding and unwinding on and off the drum and in passing the guide sheaves or pulleys, and because of the arrangement of the eyes and loops, the holder forms an equalizer in distributing the weight of the load mounted on the dolly or truck. The holder as thus arranged also reduces the labor of hitching the logs, and unhitching the logs, by facilitating the handling of the rigging for these purposes.

Having thus fully described my invention, what I claim as new and desire to secure by Letters Patent is:—

A hitch device for cables having end loops and adapted to be wound on a drum, said device comprising a flattened generally triangular holder having three spaced, transversely extending eyes, and said holder having a thickened central portion tapering above and below to edges of reduced thickness forming the outer walls of the eyes, and the walls of said eyes being rounded in cross-section to conform to the loop ends.

ANDREW E. BERGLOFF.